No. 795,609. PATENTED JULY 25, 1905.
I. B. HENDRICKSON.
SYSTEM OF CLASSIFICATION AND REFERENCE FOR MEMORANDUM LEAVES, &c.
APPLICATION FILED SEPT. 29, 1904.
2 SHEETS—SHEET 1.
FIG. 1.
FIG. 2.
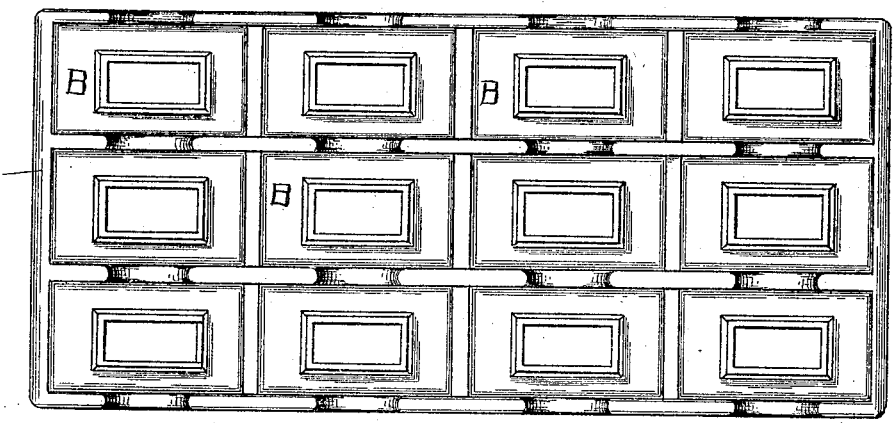
FIG. 3.
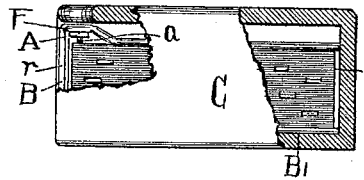
WITNESSES:
Clara M. Siewer
Osborne F. Gurney
INVENTOR:
Isaac B. Hendrickson
by W. H. Cowley Atty.

No. 795,609. PATENTED JULY 25, 1905.
I. B. HENDRICKSON.
SYSTEM OF CLASSIFICATION AND REFERENCE FOR MEMORANDUM LEAVES, &c.
APPLICATION FILED SEPT. 29, 1904.
2 SHEETS—SHEET 2.
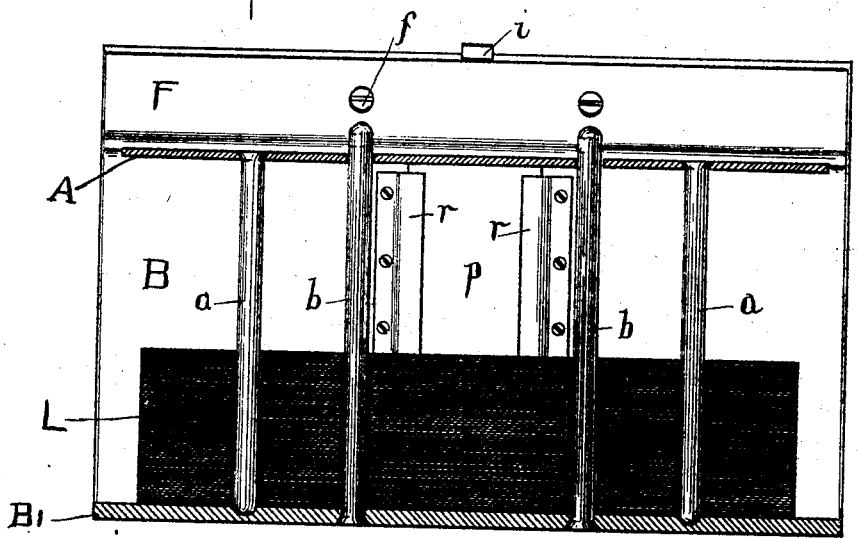
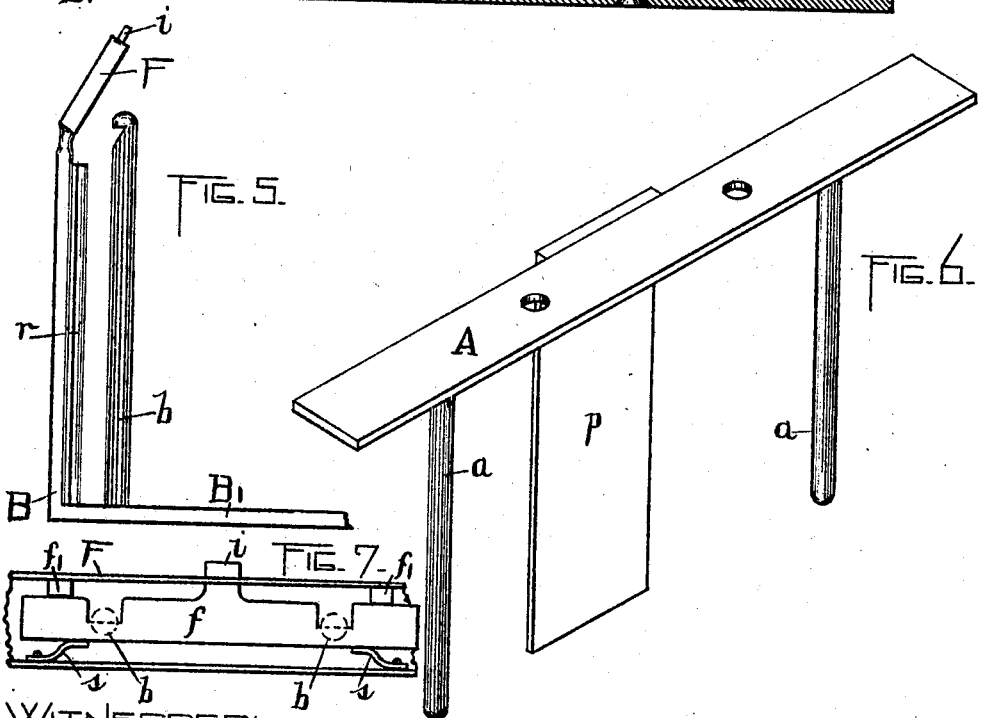

UNITED STATES PATENT OFFICE.

ISAAC B. HENDRICKSON, OF ROCHESTER, NEW YORK, ASSIGNOR TO JOHN C. MOORE CORPORATION, OF ROCHESTER, NEW YORK, A COMPANY OF NEW YORK.

SYSTEM OF CLASSIFICATION AND REFERENCE FOR MEMORANDUM-LEAVES, &c.

No. 795,609. Specification of Letters Patent. Patented July 25, 1905.

Application filed September 29, 1904. Serial No. 226,450.

*To all whom it may concern:*

Be it known that I, ISAAC B. HENDRICKSON, a citizen of the United States, residing at Rochester, in the county of Monroe and State of New York, have invented an Improved System of Classification and Reference for Memoranda-Leaves, &c., of which the following is a specification.

My present invention relates to a reference system for memoranda, whether of account or otherwise, which it is desired to classify and subclassify, and has special reference to means for retaining the leaves having the desired memoranda in a readily-accessible form under several classifications.

My invention provides also for the ready inspection of each memoranda-bearing leaf without necessitating its removal from the containing-case in which it is normally held, whether positively or removably, as desired.

My invention further provides means for retaining the leaves such that there may be suitable index or reference tabs attached to the leaves, whether removably so or otherwise, upon at least two and preferably three of their edges, thus greatly facilitating the classification of the memoranda into a larger number of classifications.

My present invention consists in arranging the leaves horizontally and supporting and retaining them in place by means of one or more retaining or locking rods lying preferably in a plane or planes parallel with the plane of the front of the receptacle or tray and so supporting such leaves on such retaining-rods that each leaf may be examined or inspected upon either side thereof without necessitating its removal from the retaining case or receptacle.

While I prefer usually that the retaining-rods be straight, still I do not limit myself to such a construction, as when desired the rods may be circular or of any desired conformation and held in their proper places by the front or by the front and bottom of the case or receptacle. The front of the receptacle may bear any suitable label indicating its contents. While it is not essential, I prefer that the connection between the front piece and the bottom of a receptacle for retaining the leaves in my reference system be of a rigid character. It is quite immaterial whether there be a cover or not; but if one is used it is preferable that its connection to the front piece be of a flexible character.

The advantage which is afforded by exposing three of the edges of the leaves in a reference system is at once obvious on account of the increased opportunity for classification by reference-tabs upon the three edges. By this means, then, a receptacle may be arranged to contain three different classes of memoranda and each one classified upon a different edge of the leaf.

In the accompanying drawings I have shown an embodiment of my invention such as is adapted to a system of correspondence such as it usually carried on between a correspondence school and a pupil. This embodiment of my invention is also adapted to the registry and classification of a correspondence between a concern and a prospective customer, in which the letters are circular letters and are sent in a regular order or sequence.

Figure 1 shows a case for holding several of the receptacles or trays. Fig. 2 is a perspective of one of the trays having indexed sheets therein, the upper one showing my system of indexing and classifying. Fig. 3 is a side view of a part of the case partly broken away, so as to show a tray therein. Fig. 4 is a sectional view of a tray or receptacle taken through the center of the retaining or locking rods, which are shown in full. Fig. 5 is a view of the parts shown in Fig. 4 as seen from the left, but with the leaves and also the plate A removed. The plate A, with its rods $a\,a$, is shown in perspective in Fig. 6. Fig. 7 shows the locking mechanism for keeping the plate A in place.

Similar letters refer to similar parts throughout the several views.

Referring to the drawings, in Fig. 1 there is seen a frame or case for holding twelve (12) trays or receptacles. These receptacles consist of a front piece B, secured to a bottom plate or piece B'. The connection between the parts B and B' may be either rigid or flexible, although I prefer that such connection be rigid, as shown in the drawings. Projecting upwardly from the bottom piece B' are seen two retaining-rods $b\,b$, rigidly secured to the bottom plate B' and lying in a plane parallel with the front B. The leaves L, of which there may be any desired number, have openings therein to receive these retaining-rods $b\,b$. Still further, openings are noted for receiving the rods $a\,a$, which are rigidly attached to the plate A, and such plate A has, as indicated, openings therein to receive the upper ends of the rods $b\ b$. This plate A has a guide $p$ projecting downwardly from the left-hand edge thereof, arranged to work in the guides $r\ r$, secured to the inner face of the front piece B of my tray. Flexibly connected to this front piece B is seen a cap-piece F. This cap-piece F, as seen in Fig. 7, consists of a channeled portion within which there is supported the catch-plate $f$, having notches therein for engaging the cooperating notches in the upper ends of the retaining-rods $b\ b$. This catch-plate $f$ has a projection $i$ extending inwardly toward the back of the tray through the rear side of the cap-piece F and is normally held against two limiting-stops $f'\ f'$ by means of the springs $s\ s$. By pressing outwardly or toward the front of the tray upon the projection $i$ the plate $f$ is forced out of engagement with the upper ends of the retaining-rods $b$, permitting then the cap-piece F to swing upwardly and forwardly to the position indicated in Fig. 5.

The memoranda cards or leaves to the desired number are inserted over the retaining-rods $b\ b$, and then the plate A, with the retaining-rods $a\ a$ projecting downwardly therefrom, is inserted in place, with the rods $a\ a$ entering the outer holes therefor in the leaves, and the guide-plate $p$ is inserted within the guides $r\ r$ and the plate A forced downwardly as far as it will go, with the lower ends of the rods $a$ resting in slight depressions therefor, as seen in Fig. 4, in the bottom B' of my tray, after which the cap-piece F is forced downwardly over the upper ends of the retaining-rods $b\ b$, causing the latch-plate $f$ to engage the notches in the upper ends of these rods $b\ b$. Suitable notches are provided, as seen in Fig. 1, in the upper and lower division-partitions between the trays to permit of readily grasping the tray-fronts B by the hand of the user.

Refer now to Fig. 2, which shows an upper one of several sheets with suitable printed matter thereon for use in a system of correspondence such as already above referred to. Across the upper edge of the sheet, as seen in Fig. 2, but along the left-hand edge as it lies in position in the case C, is seen the series of abbreviations "Jan.," "Feb.," "Mar.," &c., standing for the several months of the year except that "May," "June," and "July" are printed out in full. Across the right-hand edge of the leaf, as seen in Fig. 2, but in reality across the rear edge as in use, is seen a series of numerals "2" "4" "6," &c., standing for the corresponding days of the month, while the spaces left blank are for the first, third, fifth, &c., days of the month. Across the bottom edge of the leaf, as seen in Fig. 2, but really across its right-hand edge as in use, there is seen the printed matter as follows: Toward the right in the upper space "Form Letters to be sent," and beneath this the letters "A," "B," "C," "D," "E," "F," "G," "H," "I," "J," "K," "L," "M," "N," "O," and "P," standing for the different letters which are to be sent in conducting the correspondence. In this correspondence it is supposed that there may be sent out printed matter with each letter, which is similarly designated by the numerals "2" "3" "4" "5," &c., to "17." Referring again to Fig. 2, this leaf, it is seen, is devoted to correspondence between John Doe, and the upper or left-hand portion of the leaf bears his name and the other indications necessary to locate and designate this correspondence. The remaining portion of the leaf is devoted to a registration of the printed matter sent and the date on which it is sent, as well as to the registration of the form-letters sent, and any special letters that may be sent out may be noted in the column headed for that purpose. There may be also a column devoted to the date of the receipt of the order and the amount paid or amount of the order. These latter memoranda are quite immaterial and may be variously modified to suit the circumstances.

By reference to Fig. 2 it will be seen that printed matter was sent June 20, July 5 (of the character indicated by the figures opposite the dates given therefor, and that form-letters were sent on June 20, July 5) of the character indicated by the letter opposite the respective dates therefor, and also that there was a special letter sent out July 3. The tab $t$ on the upper or left hand edge over "Aug." indicates that the next letter is to be sent in August, and tab $t'$ over the numeral "8" on the right-hand or rear edge of the leaf indicates that the next letter is to be sent out on the 8th. The tabs $t^2$ and $t^3$ on the lower or right-hand edge of the leaf indicate the form-letter and the printed matter next to be sent. The person conducting this correspondence then upon August 8th will turn to this leaf and after sending out the desired and indicated printed matter and form-letter will move the several tabs $t$, $t'$, $t^2$, and $t^3$ to indicate the date upon which the next letter is to be sent and also the form-letter to be sent and the printed matter to go therewith. It will of course be understood that after or at the time of sending out each letter with printed matter a register thereof will be kept in the manner indicated, as well as the date upon which it was sent.

It will be readily understood then that my index and reference or classification system affords an ample opportunity for registration of letters and their character as sent out and also the month and day upon which the next letters and printed matters thereof are to be sent, as well as the form or character of the letter and the printed matter to go therewith. As each letter and its corresponding printed matter is sent out, the matter being under the consideration and receiving the attention of the one who conducts the correspondence, it is at once determined then what to send next and when to send it, and a positive record of such conclusions is kept and maintained in such a way that at the proper time the desired and already-decided-upon letter and accompanying printed matter is indicated.

I have illustrated only one of the many uses to which my index and reference system is especially adapted. I do not, however, limit myself to the use thereof described as above or to any particular use thereof or arrangement of the printed matter and classifications and tabs indicating the same.

An essential feature of my present invention consists then, in the combination with a series of tray-receptacles open at their front end, of a series of trays comprising front and bottom pieces and with retaining or locking rods arranged to hold the leaves in a horizontal rather than a vertical position, and with at least two and preferably three free edges of the leaves exposed so as to render them accessible for the insertion of index-tabs thereon, and with characters printed along two or more of such free edges of the leaves indicating the classifications and other similar memoranda to which it is desired to refer in connection with movable tabs for indicating the classifications and changing any one of the classification indications when and as desired.

It will of course be understood that when any one series of classification characters on any one of the exposed edges of the leaves is a permanent classification—that is, when the leaf bearing such classification character remains permanently in that classification represented by such character—as, for instance, a classification represented by the letter A, standing for the first letter of the surname of the party whose name appears upon the leaf—in this case of course there is no need for changeably classifying the leaf, as this leaf is permanently devoted to a class represented by "A," under which the surname of the party whose name appears on the card is permanently classified.

What I claim is—

1. In a system of classification and reference, a tray comprising a front and a bottom secured thereto and a retaining device arranged to engage suitable openings therefor in the leaves and hold them in alinement in a horizontal position in such tray, leaves in such tray having openings therein for such retaining device and bearing classification characters in one or more series along each one of two or more of their edges and movable tabs for differently and changeably classifying such leaves in classes represented by such classification characters.

2. In a system of classification and reference, a tray comprising means for supporting and retaining the leaves in alinement with two or more of their edges exposed, leaves in such tray having openings therein for such retaining device and bearing classification characters in one or more series along each one of two or more of their edges and movable tabs for differently and changeably classifying such leaves in classes represented by such classification characters.

3. In a system of classification and reference, a tray comprising means for supporting and retaining the leaves in alinement with two or more of their edges exposed, leaves in such tray, a separate series of classification characters along each one of two or more of the edges of such leaves and movable tabs for differently and changeably classifying such leaves according to such classification characters.

4. In a system of classification and reference, a receptacle for memoranda-leaves comprising means for supporting and retaining the leaves in alinement with two or more of their edges exposed, leaves in such receptacle, two separate series of classification characters on such leaves and movable tabs coöperating with such classification characters for differently and changeably classifying such leaves according to such classification characters, the tabs referring to such different series of characters arranged to engage correspondingly-different edges of the leaves.

5. In a system of classification and reference, a tray comprising a front and a bottom secured thereto and a retaining device arranged to engage suitable openings therefor in the leaves and hold them in alinement in a horizontal position in such tray, leaves in such tray having openings therein for such retaining device and bearing classification characters in one or more series along each one of two or more of their edges and movable tabs for differently and changeably classifying such leaves in classes represented by such classification characters in one of the series thereof and on one of the exposed edges of such leaves.

6. In a system of classification and reference, a tray comprising means for supporting and retaining the leaves in alinement with two or more of their edges exposed, leaves in such tray having openings therein for such retaining device and bearing classification characters in one or more series along each one of two or more of their edges and movable tabs for differently and changeably classifying such leaves in classes represented by such classification characters in one of the series thereof and on one of the exposed edges of such leaves.

7. In a system of classification and reference, a tray comprising means for supporting and retaining the leaves in alinement with two or more of their edges exposed, leaves in such tray, a separate series of classification characters along each one of two or more of the edges of such leaves and movable tabs for differently and changeably classifying such leaves according to such classification characters in one of the series thereof and on one of the exposed edges of such leaves.

8. In a system of classification and reference, a tray comprising a front and a bottom secured thereto and a retaining device arranged to removably engage suitable openings therefor in the leaves and hold them in alinement in a horizontal position in such tray, leaves in such tray having openings therein for such retaining device and bearing classification characters in one or more series along each one of two or more of their edges and movable tabs for differently and changeably classifying such leaves in classes represented by such classification characters.

9. In a system of classification and reference, a tray comprising means for removably supporting and retaining the leaves in alinement with two or more of their edges exposed, leaves in such tray having openings therein for such retaining device and bearing classification characters in one or more series along each one of two or more of their edges and movable tabs for differently and changeably classifying such leaves in classes represented by such classification characters.

10. In a system of classification and reference, a tray comprising means for removably supporting and retaining the leaves in alinement with two or more of their edges exposed, leaves in such tray, a separate series of classification characters along each one of two or more of the edges of such leaves and movable tabs for differently and changeably classifying such leaves according to such classification characters.

11. In a system of classification and reference, a receptacle for memoranda-leaves, comprising means for removably supporting and retaining the leaves in alinement with two or more of their edges exposed, leaves in such receptacle, two separate series of classification characters on such leaves and movable tabs coöperating with such classification characters for differently and changeably classifying such leaves according to such classification characters, the tabs referring to such different series of characters arranged to engage correspondingly-different edges of the leaves.

12. In a system of classification and reference, a tray comprising a front and a bottom secured thereto and a retaining device arranged to removably engage suitable openings therefor in the leaves and hold them in alinement in a horizontal position in such tray, leaves in such tray having openings therein for such retaining device and bearing classification characters in one or more series along each one of two or more of their edges and movable tabs for differently and changeably classifying such leaves in classes represented by such classification characters in one of the series thereof and on one of the exposed edges of such leaves.

13. In a system of classification and reference, a tray comprising means for removably supporting and retaining the leaves in alinement with two or more of their edges exposed, leaves in such tray having openings therein for such retaining device and bearing classification characters in one or more series along each one of two or more of their edges and movable tabs for differently and changeably classifying such leaves in classes represented by such classification characters in one of the series thereof and on one of the exposed edges of such leaves.

14. In a system of classification and reference, a tray comprising means for removably supporting and retaining the leaves in alinement with two or more of their edges exposed, leaves in such tray, a separate series of classification characters along each one of two or more of the edges of such leaves and movable tabs for differently and changeably classifying such leaves according to such classification characters in one of the series thereof and on one of the exposed edges of such leaves.

ISAAC B. HENDRICKSON.

Witnesses:
    CLARA M. LIENER,
    OSBORNE F. GURNEY.